(12) United States Patent
Sannomiya et al.

(10) Patent No.: US 12,337,402 B2
(45) Date of Patent: Jun. 24, 2025

(54) MACHINING DEVICE, MACHINING METHOD AND CUTTING TOOL

(71) Applicants: CITIZEN WATCH CO., LTD., Tokyo (JP); CITIZEN MACHINERY CO., LTD., Nagano (JP)

(72) Inventors: Kazuhiko Sannomiya, Kitasaku-gun (JP); Shinichi Mutou, Kitasaku-gun (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 463 days.

(21) Appl. No.: 17/784,014

(22) PCT Filed: Nov. 30, 2020

(86) PCT No.: PCT/JP2020/044415
§ 371 (c)(1),
(2) Date: Jun. 9, 2022

(87) PCT Pub. No.: WO2021/117526
PCT Pub. Date: Jun. 17, 2021

(65) Prior Publication Data
US 2023/0050486 A1    Feb. 16, 2023

(30) Foreign Application Priority Data

Dec. 10, 2019    (JP) .................................. 2019-222601

(51) Int. Cl.
*B23G 1/04*        (2006.01)
*B23B 1/00*        (2006.01)
(Continued)

(52) U.S. Cl.
CPC .................. *B23G 1/04* (2013.01); *B23B 1/00* (2013.01); *B23B 25/02* (2013.01); *B23G 9/004* (2013.01);
(Continued)

(58) Field of Classification Search
CPC ...... B23G 1/04; B23G 9/004; B23G 2200/10; B23G 2240/36; B23G 1/02; B23B 25/02;
(Continued)

(56) References Cited

U.S. PATENT DOCUMENTS 4,203,062 A  *  5/1980  Bathen ..................... B23Q 5/36
                                                        82/134
4,457,065 A  *  7/1984  Coate .................. B23Q 3/15506
                                                        483/25
(Continued)

FOREIGN PATENT DOCUMENTS

JP        60-186103 U      12/1985
JP        11-514939 A      12/1999
(Continued)

OTHER PUBLICATIONS

International Search Report for PCT/JP2020/044415 (PCT/ISA/210) mailed on Feb. 2, 2021.
(Continued)

*Primary Examiner* — Sara Addisu
(74) *Attorney, Agent, or Firm* — Birch, Stewart, Kolasch & Birch, LLP

(57) ABSTRACT

A machining device threads a workpiece by relatively rotating the workpiece and a multi-blade tool and relatively moving them along a feed direction to perform cutting processes in the radial direction of the workpiece along the same cutting path in a predetermined spiral form. A controller performs a groove machining to form a threaded portion with vibration in the radial direction of the work-
(Continued)

piece and a finish machining to form the threaded portion by bringing the multi-blade tool into contact with the grooved portion of the workpiece. The multi-blade tool has a first cutting blade and a second cutting blade arranged side by side along the feed direction. The controller sets amplitude of a vibration waveform to a value at which a cutting edge of the second cutting blade does not come into contact with the screw bottom surface of the workpiece in the finish machining.

2 Claims, 9 Drawing Sheets

(51) Int. Cl.
    *B23B 25/02*         (2006.01)
    *B23G 9/00*          (2006.01)
    *B23Q 15/12*         (2006.01)
    *G05B 19/4093*     (2006.01)

(52) U.S. Cl.
    CPC ......... *B23Q 15/12* (2013.01); *G05B 19/4093* (2013.01); *B23G 2200/10* (2013.01); *B23G 2240/36* (2013.01)

(58) Field of Classification Search
    CPC ... B23B 1/00; B23B 2220/445; B23B 27/065; B23Q 15/12; G05B 19/4093; G05B 19/186; G05B 2219/49053
    See application file for complete search history.

(56) References Cited

U.S. PATENT DOCUMENTS

| | | | |
|---|---|---|---|
| 4,646,595 A * | 3/1987 | Slee | B23B 29/125 |
| | | | 82/904 |
| 6,138,540 A | 10/2000 | Niemi | |
| 7,445,409 B2 * | 11/2008 | Trice | B23B 29/26 |
| | | | 407/119 |
| 7,571,669 B2 * | 8/2009 | Eba | G05B 19/184 |
| | | | 82/133 |
| 9,352,396 B2 * | 5/2016 | Hankey | B23B 27/1677 |
| 9,895,749 B2 * | 2/2018 | Tasaki | B23B 5/12 |
| 10,464,139 B2 * | 11/2019 | Best | B23B 29/26 |
| 2002/0054793 A1 | 5/2002 | Kataoka et al. | |
| 2003/0223830 A1 * | 12/2003 | Bryan | B29C 59/022 |
| | | | 407/119 |
| 2008/0226404 A1 * | 9/2008 | Nada | B23B 27/065 |
| | | | 407/53 |
| 2017/0102685 A1 * | 4/2017 | Kitakaze | B23B 25/02 |
| 2017/0108846 A1 * | 4/2017 | Sannomiya | B23Q 17/12 |
| 2017/0246718 A1 * | 8/2017 | Sannomiya | B23B 25/02 |
| 2017/0297159 A1 * | 10/2017 | Sannomiya | B23B 25/02 |
| 2017/0304920 A1 | 10/2017 | Sannomiya et al. | |
| 2018/0243834 A1 * | 8/2018 | Sannomiya | B23Q 15/013 |
| 2018/0257192 A1 * | 9/2018 | Nakaya | B23Q 15/013 |
| 2018/0281090 A1 * | 10/2018 | Watanabe | G05B 19/4093 |
| 2018/0345434 A1 * | 12/2018 | Nakaya | G05B 19/4093 |
| 2021/0370455 A1 * | 12/2021 | Sannomiya | B23B 25/02 |
| 2022/0161339 A1 * | 5/2022 | Sannomiya | G05B 19/186 |

FOREIGN PATENT DOCUMENTS

| | | |
|---|---|---|
| JP | 2008-254164 A | 10/2008 |
| JP | 2020-66809 A | 4/2020 |
| WO | WO 2016/056526 A1 | 4/2016 |

OTHER PUBLICATIONS

Written Opinion of the International Searching Authority for PCT/JP2020/044415 (PCT/ISA/237) mailed on Feb. 2, 2021.

* cited by examiner

FIG.3
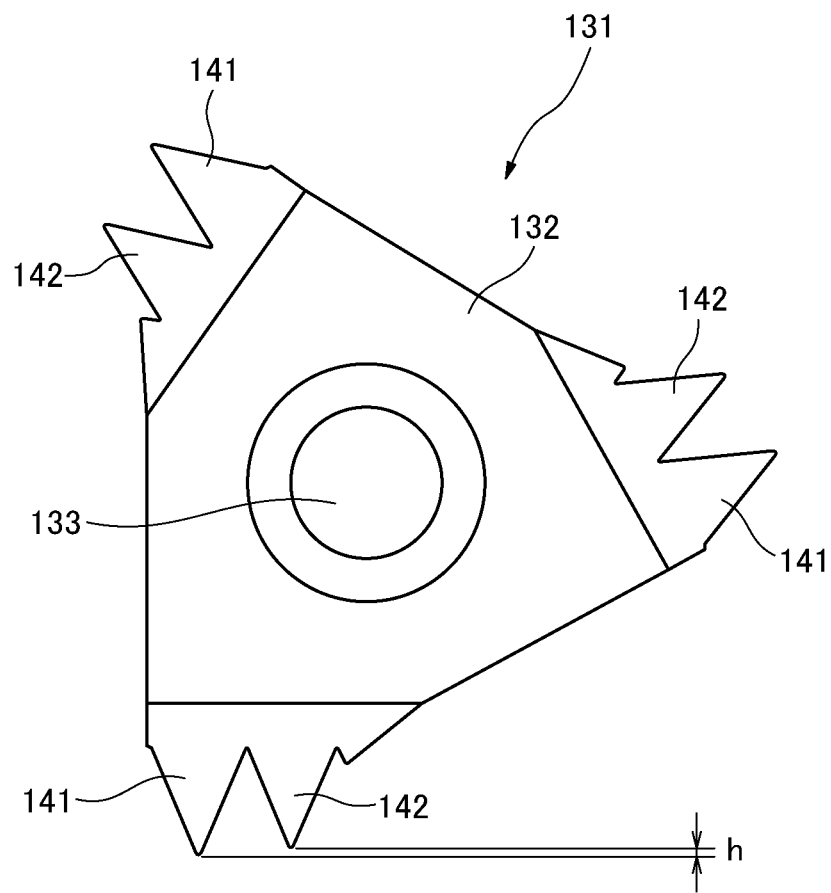
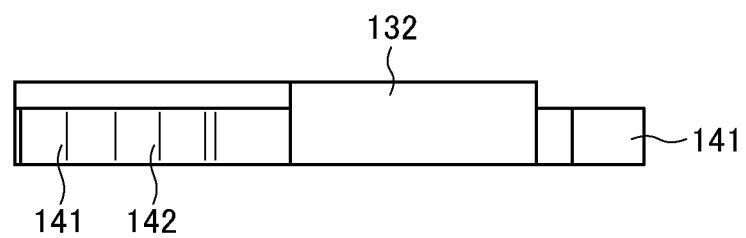

MACHINING DEVICE, MACHINING METHOD AND CUTTING TOOL

TECHNICAL FIELD

The present invention relates to a machining device, a machining method and a cutting tool for threading a workpiece.

BACKGROUND ART

Conventionally, when forming a threaded portion on the outer periphery of a workpiece using a tip, a cutting blade of the tip cuts in the radial direction of the workpiece, and the workpiece is fed in the axial direction and rotated about the axis. The cutting blade is formed in the same shape as the thread groove, and there are types of tips in which one has one cutting blade and another has a plurality of cutting blades (this type is referred to as a multi-blade tool). For example, the Patent Literature 1 discloses a structure of a multi-blade tool in which a first cutting blade and a second cutting blade are arranged side by side.

CITATION LIST

Patent Literature

[Patent Literature 1] JP 60-186103 Y

SUMMARY OF INVENTION

Technical Problem

According to the multi-blade tool described in the Patent Literature 1, even if the first cutting blade is worn, the second cutting blade right behind the first cutting blade can re-cut a portion that could not be cut by the first cutting blade.

However, if this multi-blade tool is used, the second cutting blade cuts a portion that was cut by the first cutting blade. Therefore, the machining accuracy of the screw bottom surface of the workpiece may be low.

The present invention has been made in view of the above circumstances, and an object of the present invention is to provide a machining device, a machining method and a cutting tool for improving the machining accuracy of the screw bottom surface of the workpiece.

Solution to Problem

Firstly, in the present invention, a machining device includes: a workpiece holder holding a workpiece; a tool post for holding a multi-blade tool for cutting the workpiece; a feeder feeding the multi-blade tool in a predetermined feed direction relative to the workpiece via relative movement of the workpiece holder and the tool post; a vibrator relatively and reciprocally vibrating the workpiece holder and the tool post in a radial direction of the workpiece; and a rotator relatively rotating the workpiece and the multi-blade tool, the multi-blade tool having a first cutting blade and a second cutting blade that are arranged side by side along the feed direction, the second cutting blade being located behind the first cutting blade and having length shorter than length of the first cutting blade, and the machining device threading the workpiece to form a threaded portion on the workpiece by relatively rotating the workpiece and the multi-blade tool and relatively moving the workpiece and the multi-blade tool along the feed direction to perform multiple times of cutting processes in the radial direction of the workpiece along the same cutting path in a predetermined spiral form, wherein the machining device includes a controller controlling operations of the feeder, the vibrator and the rotator so that a groove machining to form the threaded portion with the vibration in the radial direction of the workpiece and a finish machining to form the threaded portion by bringing the multi-blade tool into contact with the grooved portion of the workpiece are performed, and the controller sets amplitude of a vibration waveform, which is set for the vibrator, to a value at which a cutting edge of the second cutting blade does not come into contact with a screw bottom surface of the workpiece in the finish machining.

Secondly, in the present invention, the controller sets the amplitude of the vibration waveform, which is set for the vibrator, to zero in the finish machining.

Thirdly, the present invention is a machining method of threading a workpiece to form a threaded portion on the workpiece by relatively rotating the workpiece and a multi-blade tool for cutting the workpiece and relatively moving the workpiece and the multi-blade tool along a predetermined feed direction to perform multiple times of cutting processes in a radial direction of the workpiece along the same cutting path in a predetermined spiral form. The multi-blade tool has a first cutting blade and a second cutting blade that are arranged side by side along the feed direction, the second cutting blade is located behind the first cutting blade and has length shorter than length of the first cutting blade. The threading includes a groove machining to form the threaded portion with relative and reciprocal vibration of the workpiece and the multi-blade tool in the radial direction of the workpiece and a finish machining to form the threaded portion by bringing the multi-blade tool into contact with the grooved portion of the workpiece. In the finish machining, amplitude of a vibration waveform, which is set for the reciprocal vibration, is set to a value at which a cutting edge of the second cutting blade does not come into contact with a screw bottom surface of the workpiece.

Fourthly, the present invention is a cutting tool used for a machining method of threading a workpiece to form a threaded portion on the workpiece. The machining method includes, relatively rotating the workpiece and a multi-blade tool for cutting the workpiece, and relatively moving the workpiece and the multi-blade tool along a predetermined feed direction to perform multiple times of cutting processes in a radial direction of the workpiece along the same cutting path in a predetermined spiral form. The threading includes a groove machining to form the threaded portion with relative and reciprocal vibration of the workpiece and the multi-blade tool in the radial direction of the workpiece and a finish machining to form the threaded portion by bringing the multi-blade tool into contact with the grooved portion of the workpiece. The multi-blade tool has a first cutting blade, which is used for both of the groove machining and the finish machining, and a second cutting blade, which is located behind the first cutting blade and used for only the groove machining, that are arranged side by side along the feed direction, and the second cutting blade has length shorter than length of the first cutting blade.

Advantageous Effect of Invention

The present invention can obtain the following effect.

In the finish machining, the cutting edge of the second cutting blade does not come into contact with the screw bottom surface of the workpiece. Therefore, even if thread cutting is performed using the multi-blade tool, a threaded portion with high machining accuracy can be formed.

BRIEF DESCRIPTION OF DRAWINGS

FIG. 3 is a diagram illustrating the multi-blade tool.

DESCRIPTION OF EMBODIMENTS

Figure 1:
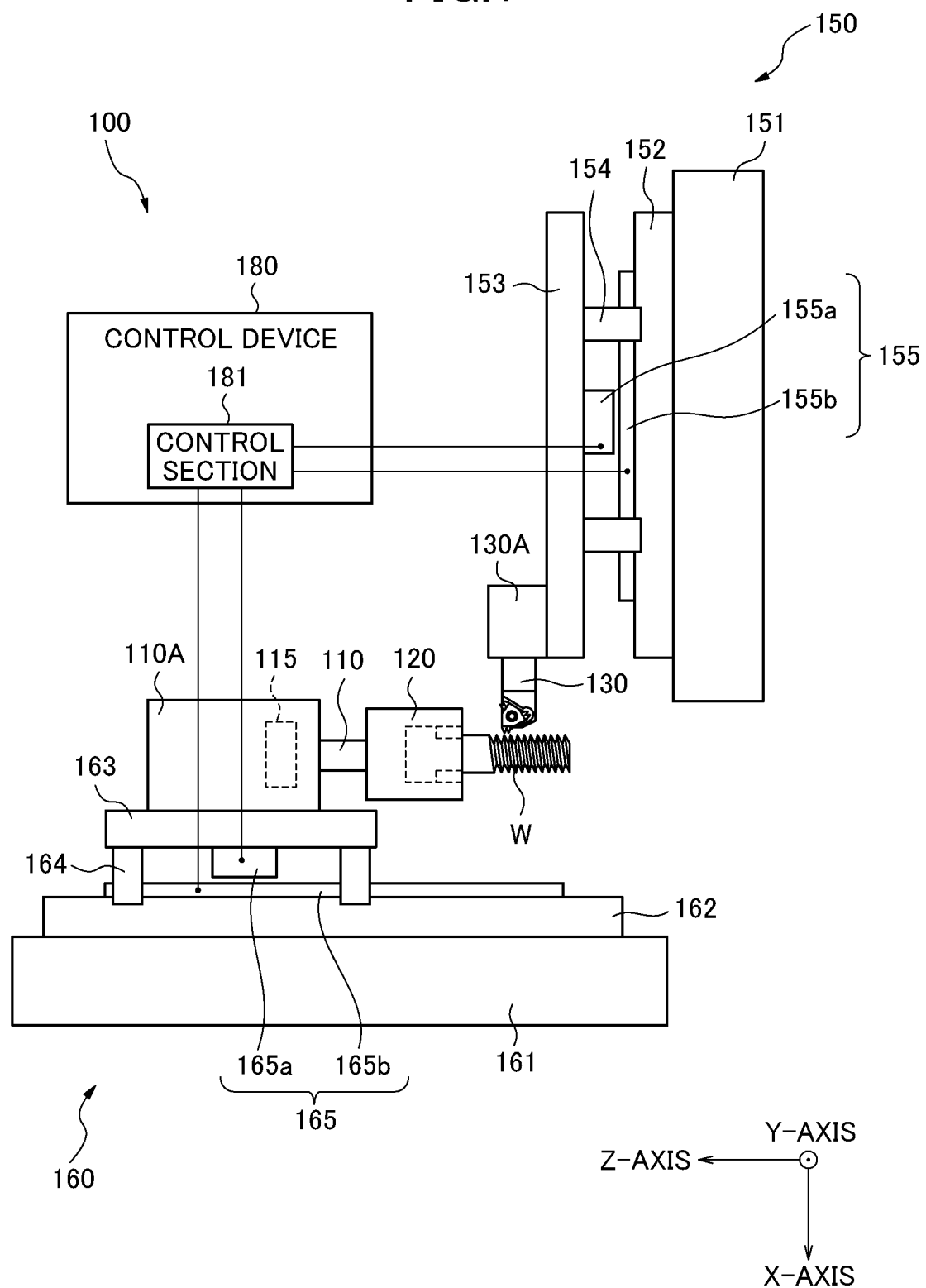
FIG. 1 is a diagram illustrating the outline of a machining device according to an embodiment of the present invention.

Hereinafter, a machining device, a machining method and a cutting tool according to the present invention will be described with reference to drawings. As shown in FIG. 1, a machine tool 100 includes a spindle 110, a tool post 130A and a control device 180. The machine tool 100 corresponds to the machining device of the present invention.

A chuck 120 is provided at the end of the spindle 110, and the workpiece W is held by the spindle 110 via the chuck 120. The spindle 110 corresponds to a workpiece holding means (workpiece holder). The spindle 110 is rotatably supported by a spindle headstock 110A and rotationally driven by the power of a spindle motor 115 (for example, a built-in motor) provided between the spindle headstock 110A and the spindle 110, for example.

The spindle headstock 110A is installed on a Z-axis direction feeding mechanism 160.

The Z-axis direction feeding mechanism 160 includes a base 161 integral with a bed, and a Z-axis direction guide rail 162 slidably supporting a Z-axis direction feeding table 163. When the Z-axis direction feeding table 163 is moved by the drive of a linear servomotor 165 along the Z-axis direction shown in the figure which coincides with the rotational axis direction of the workpiece W, the spindle headstock 110A moves in the Z-axis direction. The linear servomotor 165 has a mover 165a and a stator 165b. The mover 165a is provided on the Z-axis direction feeding table 163, and the stator 165b is provided on the base 161.

A cutting tool 130 such as a tool bit for turning a workpiece W is mounted on the tool post 130A, and the tool post 130A is installed on an X-axis direction feeding mechanism 150.

The X-axis direction feeding mechanism 150 includes a base 151 integral with a bed, and an X-axis direction guide rail 152 slidably supporting an X-axis direction feeding table 153. When the X-axis direction feeding table 153 is moved along the X-axis direction orthogonal to the Z-axis direction shown in the figure by the drive of a linear servomotor 155, the tool post 130A moves in the X-axis direction. The linear servomotor 155 has a mover 155a and a stator 155b. The mover 155a is provided on the X-axis direction feeding table 153, and the stator 155b is provided on the base 151.

A Y-axis direction feeding mechanism may be provided in the machine tool 100. The Y-axis direction is a direction orthogonal to the Z-axis direction and the X-axis direction shown in the figure. The Y-axis direction feeding mechanism may have the same structure as the Z-axis direction feeding mechanism 160 or the X-axis direction feeding mechanism 150. As is conventionally known, the cutting tool 130 can be moved in the Y-axis direction in addition to the X-axis direction by a combination of the X-axis direction feeding mechanism 150 and the Y-axis direction feeding mechanism.

Although the Z-axis direction feeding mechanism 160, the X-axis direction feeding mechanism 150 and the Y-axis direction feeding mechanism have been described with an example using a linear servomotor, a known ball screw and servomotor may be used.

The rotation of the spindle 110, the movements of the Z-axis direction feeding mechanism 160, the X-axis direction feeding mechanism 150 and the like are controlled by a control section 181 (controller).

The control section 181 is composed of a CPU, a memory or the like, loads various programs and data which are stored in a ROM or the like into a RAM, and executes the program. Thereby, the operation of the machine tool 100 can be controlled on the basis of the program.

Figure 2:
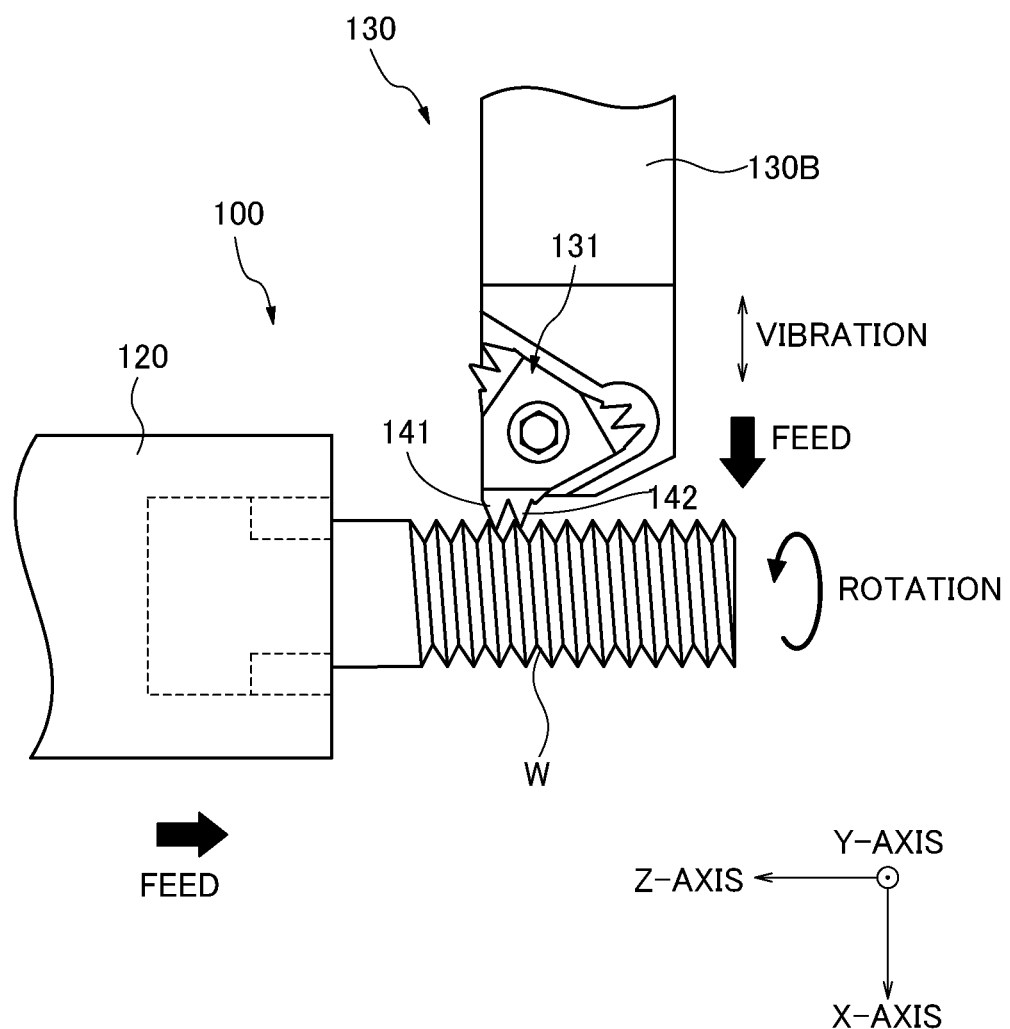
FIG. 2 is a diagram illustrating the relationship between a workpiece and a multi-blade tool.

In the example of FIG. 1, the control section 181 drives the spindle motor 115 to rotate the workpiece W relative to the cutting tool 130 and drives the Z-axis direction feeding mechanism 160 to move the workpiece W relative to the cutting tool 130 in the Z-axis direction. Further, the X-axis direction feeding mechanism 150 is driven to reciprocally vibrate the cutting tool 130 relative to the workpiece W in the X-axis direction to perform multiple times of cutting along the same cutting path in a predetermined spiral form. Thereby, a threaded portion is machined on the workpiece W by the cutting tool 130 as shown in FIG. 2.

The cutting tool 130 has a holder 130B held by the tool post 130A, and for example, a tip 131 for machining the workpiece W to form an external screw is screwed to the end of the holder 130B.

As shown in FIG. 3, the tip 131 has a tool main body 132 formed in a prismatic shape, and a through hole 133, through which a screw for clamping the tip 131 to the holder 130B is inserted, is formed at the center of the tool main body 132. A set of (for example, two) cutting blades (a front blade 141 and a rear blade 142) is formed on the outer periphery of the tool main body 132. The front blade 141 corresponds to a first cutting blade, and the rear blade 142 corresponds to a second cutting blade. As described above, the tip 131 has a plurality of cutting blades and corresponds to a multi-blade tool for cutting the workpiece W. Three sets of the front blade 141 and the rear blade 142 are provided on the outer periphery of the tool main body 132, and are arranged at equal intervals from each other.

The front blade 141 and the rear blade 142 are arranged side by side along the feed direction (Z-axis direction in FIG. 2), and the front blade 141 is located in front of (in the positive direction in the Z-axis and the same direction as the arrow of Z-axis, and the same is applied hereinafter) the rear blade 142. The front blade 141 and the rear blade 142 are formed in the same shape as the thread groove to be machined, and the distance between the front blade 141 and the rear blade 142 is determined based on the pitch of the thread portion to be machined.

Further, in a case where the cutting edges of the front blade 141 and the rear blade 142 are arranged so as to face the positive direction in the X axis in FIG. 2 (the same direction as the arrow of the X axis and the same is applied hereinafter) and where the workpiece W is fed in the negative direction in the Z axis in FIG. 2 (the opposite direction to the arrow of the Z axis, and the same is applied hereinafter) and rotated from the back side toward the forward side shown by the arrow in FIG. 2 in a state where the workpiece W is in contact with the cutting edges of the front blade 141 and the rear blade 142, a right threaded screw is formed on the workpiece W.

If a left threaded screw is to be formed on the workpiece W, the cutting edges of the front blade 141 and the rear blade 142 are arranged so as to face the negative direction in the X-axis in FIG. 2 (the direction opposite to the arrow of the X-axis, and the same is applied hereinafter), and the workpiece W is fed in the negative direction in the Z axis of FIG. 2 and rotated in the direction opposite to the arrow in FIG. 2.

When threading the workpiece W, the control section 181 sets the number of cuttings to (for example) five, as illustrated in FIGS. 4 to 9, and the workpiece is cut five times in a spiral form to form a threaded portion. Here, the number of cuttings is the number of cuttings until the threaded portion is formed.

More specifically, for example, after four groove machining is performed, one finish machining is performed.

First, the groove machining is a step of forming a threaded portion with vibration in the radial direction of the workpiece W (while reciprocally vibrating the tip 131 relative to the workpiece W in the X-axis direction), and both of the front blade 141 and the rear blade 142 are used.

Figure 4:
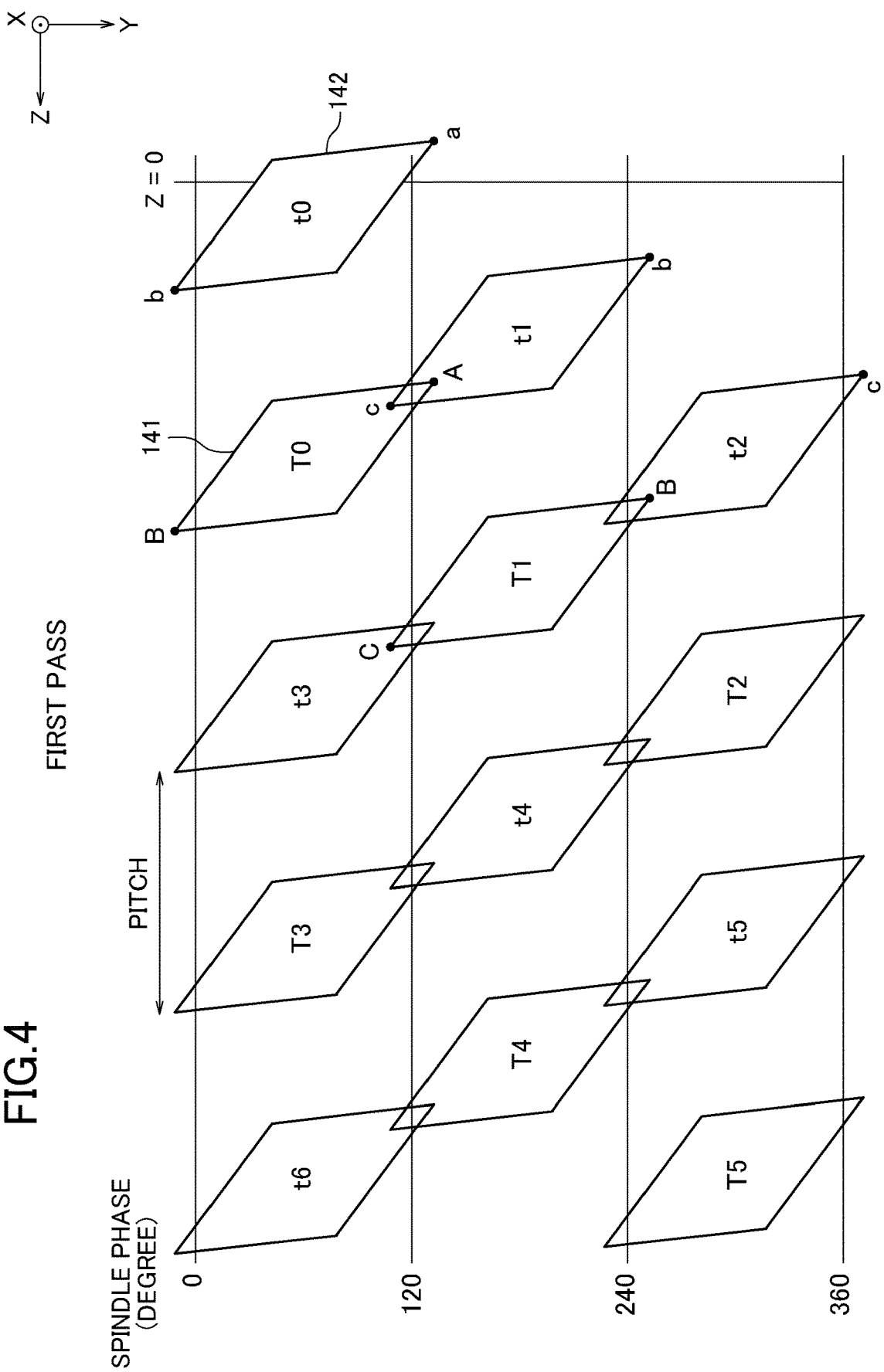
FIG. 4 is a diagram illustrating the time-series operation (in the first pass) of the threading.
Figure 7:
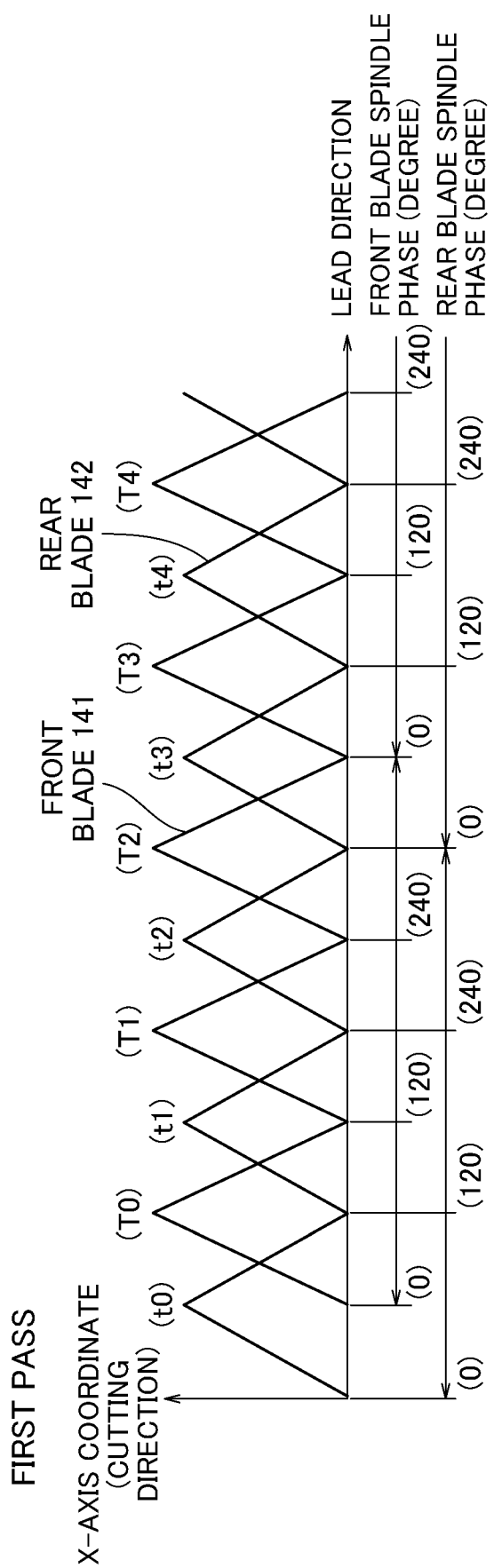
FIG. 7 is a diagram illustrating the tool locus (in the first pass).

FIGS. 4 and 7 are diagrams illustrating the first pass of the groove machining. The cutting edges of the front blade 141 and the rear blade 142 are arranged so as to face the positive direction in the X axis, and the machining time is set to 0 sec when the rear blade 142 is at the position of Z=0. At this point, the cutting edge of the front blade 141 is located at point A in FIG. 4, and the cutting edge of the rear blade 142 is located at point a in FIG. 4.

As the workpiece W rotates, the cutting edges move relatively in the negative direction in the Y axis in FIG. 4 (the direction opposite to the arrow of the Y axis, and the same is applied hereinafter), and as the workpiece W is fed in the negative direction in the Z axis in FIG. 2, the cutting edges move in the positive direction in the Z axis in FIG. 4. The front blade 141 and the rear blade 142 move (forward) in the radial direction of the workpiece W (positive direction in the X-axis: the back side of the paper surface) by a predetermined forward movement amount, and then move (backward) in the opposite direction by a predetermined backward movement amount. In FIGS. 4 and 7, an example is used in which the number of vibrations D, which is the number of reciprocating movements of the cutting tool 130 in one rotation of the workpiece W, is 3 (times/r).

Particularly, the rear blade 142 advances from the point a to the point b in FIG. 4 to form a tool locus as a cutting mark t0. At that time, the rear blade 142 is gradually pushed in the positive direction in the X axis from the point a, the cutting depth becomes the largest at the intermediate position between the points a and b, the cutting depth gradually decreases as approaching the point b, and then, the rear blade 142 reaches the point b.

Due to the relative movement of the cutting edge, after the lapse of a predetermined time, the rear blade 142 moves from the point b of the tool locus t0 to the point b of a tool locus t1.

After that, the rear blade 142 moves from the point b of the tool locus t1 to the point c of the same t1. Also at that time, the rear blade 142 is gradually pushed in the positive direction in the X axis from the point b, the cutting depth becomes the largest at the intermediate position between the points b and c, the cutting depth gradually decreases as approaching the point c, and then, the rear blade 142 reaches the point c. After that, the rear blade 142 moves in the order of tool loci t2, t3, t4, t5 and t6.

The front blade 141 is at a position in front of the rear blade 142 by one pitch. Therefore, while the rear blade 142 is located on the tool locus t0, the front blade 141 moves from the point A to the point B in FIG. 4 to form a tool locus T0. At that time, the front blade 141 is gradually pushed in the positive direction in the X axis from the point A, the cutting depth becomes the largest at the intermediate position between the points A and B, the cutting depth gradually decreases as approaching the point B, and then, the front blade 141 reaches the point B. Due to the relative movement of the cutting edge, after the lapse of a predetermined time, the front blade 141 moves from the point B of the tool locus T0 to the point B of a tool locus T1. After that, the front blade 141 moves from the point B of the tool locus T1 to the point C of the same T1, and after that the front blade 141 moves in the order of tool loci T2, T3, T4 and T5.

In the first pass, since the machining time is set to 0 sec when the rear blade 142 is at the position of Z=0, as shown in FIG. 7 in which the vertical axis is the X-axis coordinate (cutting direction) and the horizontal axis is the lead direction, the tool locus t0 of the rear blade 142 reciprocally vibrates so that the cutting is started from the position of the rear blade spindle phase=0 (degree), and the tool locus t0 peaks at the position of the rear blade spindle phase=60 (degrees) and the return movement starts. Then, the blade edge of the rear blade 142 reaches the outer peripheral surface of the workpiece W at the position of the rear blade spindle phase=120 (degrees). Next, the tool locus t1 of the rear blade 142 reciprocally vibrates so that the cutting is started from the position of the rear blade spindle phase=120 (degrees), and the blade edge of the rear blade 142 reaches the outer peripheral surface of the workpiece W at the position of the rear blade spindle phase=240 (degrees).

On the other hand, in the first pass, the front blade 141 is at the position of the rear blade spindle phase=60 (degrees) when the rear blade 142 is at the position of Z=0. Therefore, the tool locus T0 of the front blade 141 reciprocally vibrates so that the cutting is started from the position of the rear blade spindle phase=60 (degrees), which is the position of the front blade spindle phase=0 (degree), and the tool locus T0 peaks at the position of the rear blade spindle phase=120 (degrees), which is the position of the front blade spindle phase=60 (degrees), and the return movement starts. Then, the blade edge of the front blade 141 reaches the outer peripheral surface of the workpiece W at the position of the rear blade spindle phase=180 (degrees), which is the position of the front blade spindle phase=120 (degrees).

Therefore, as shown in FIG. 7, the tool locus of the front blade 141 and the tool locus of the rear blade 142 deviate from each other in the spindle phase (horizontal axis direction in the graph of FIG. 7), and the tool locus of the front blade 141 and the tool locus of the rear blade 142 overlap. During the overlapping period of the tool loci in which the tool locus t0 of the rear blade 142 is included in the tool locus T0 of the front blade 141, a portion of the workpiece W to be cut by the rear blade 142 has already been cut by the front blade 141 (tool locus T0). Therefore, there is an air-cut period in which the rear blade 142 (tool locus t0) substantially does not cut the workpiece W, and a chip generated on the workpiece W is divided into segmented chips. After that, in the first pass, when the rear blade 142 reaches the tool locus of the front blade 141 in the return movement, chips are divided.

Figure 5:
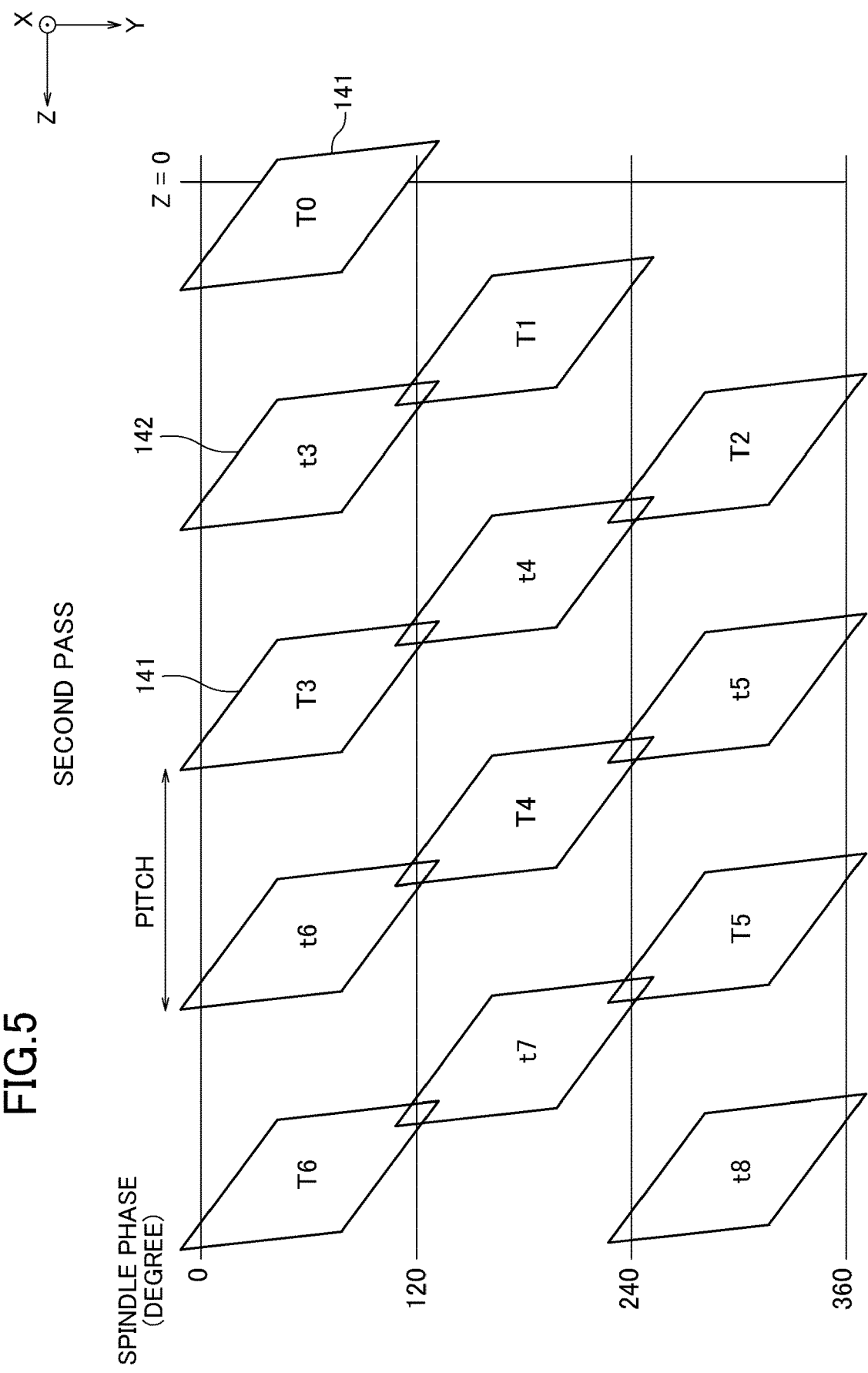
FIG. 5 is a diagram illustrating the time-series operation (in the second pass) of the threading.
Figure 8:
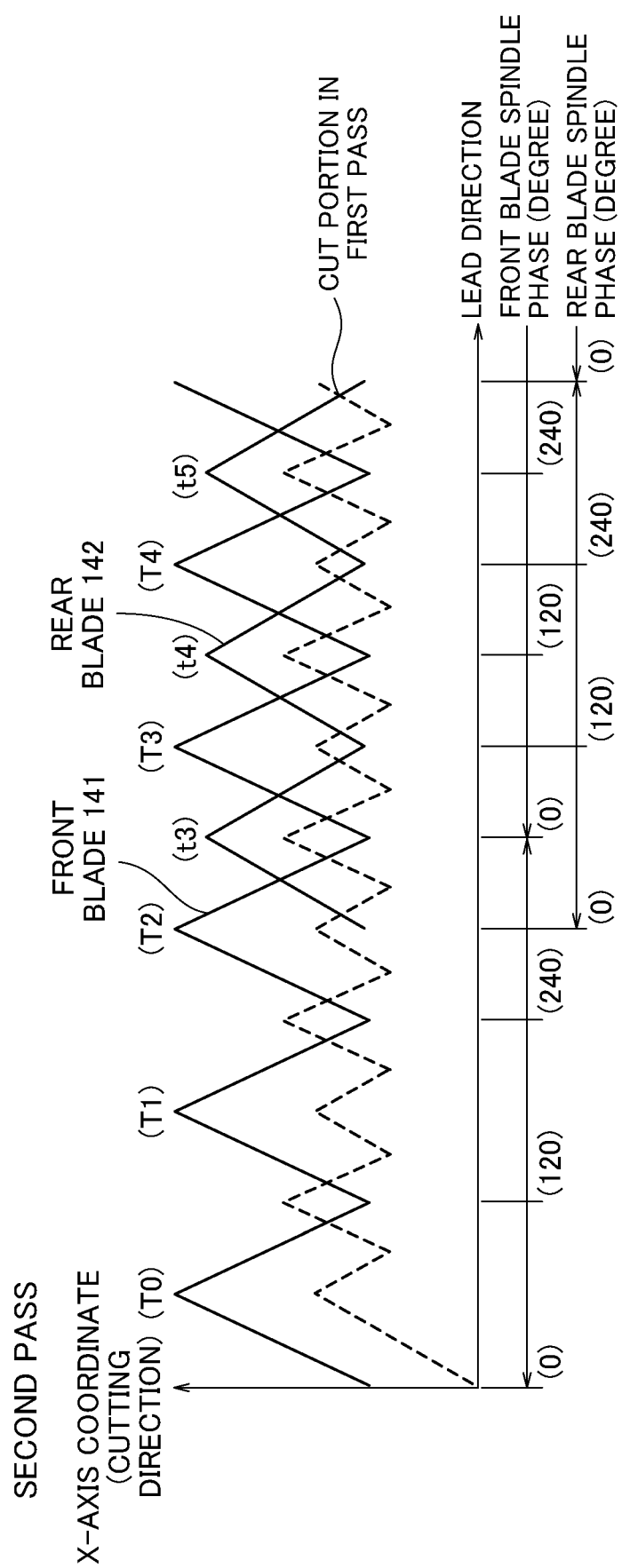
FIG. 8 is a diagram illustrating the tool locus (in the second pass).

FIGS. 5 and 8 are diagrams illustrating the groove machining in the second pass. The cutting amount in the second pass is set to, for example, the same value as the cutting amount in the first pass, and the machining time is set to 0 sec when the front blade 141 having the cutting edge facing the positive direction in the X axis is at the position of Z=0.

The front blade 141 moves in the order from the tool locus T0 to T1, T2, T3, T4, T5 and T6, and the rear blade 142 is at the position of Z=0 (indicated by the tool locus t3) at the time when the front blade 141 is on the tool locus T3, and moves in the order of t4, t5, t6, t7 and t8.

In the second pass, the machining time is set to 0 sec when the front blade 141 is at the position of Z=0. Therefore, as shown in FIG. 8, the tool locus T0 of the front blade 141 reciprocally vibrates so that the cutting starts from the position of the front blade spindle phase=0 (degree), peaks at the position of the front blade spindle phase=60 (degrees) and the return movement starts. Then, the tool locus T0 reaches the cut portion in the first pass (indicated by the broken line in the figure) before the front blade spindle phase=120 (degrees). Next, the tool locus T1 of the front blade 141 reciprocally vibrates so that the cutting starts from the position of the front blade spindle phase=120 (degrees), and reaches the cut portion in the first pass before the front blade spindle phase=240 (degrees).

Therefore, as shown in FIG. 8, the tool locus of the front blade 141 and the cut portion in the first pass overlap. During the overlapping period of the tool loci in which the tool locus T0 of the front blade 141 is included in the cut portion in the first pass, there is the air-cut period in which the front blade 141 (tool locus T0) substantially does not cut the workpiece W, and a chip generated on the workpiece W is divided into segmented chips.

On the other hand, in the second pass, the rear blade 142 is at the position of Z=0 (indicated by the tool locus t3) at the time when the front blade 141 is in the tool locus T3. Therefore, the tool locus t3 of the rear blade 142 reciprocally vibrates so that the cutting is started from the position of the front blade spindle phase=300 (degrees), which is the position of the rear blade spindle phase=0 (degree), and the tool locus t3 peaks at the position of the front blade spindle phase=0 (degree), which is the position of the rear blade spindle phase=60 (degrees), and the return movement starts. Then, the blade edge of the rear blade 142 reaches the tool locus T3 of the front blade 141 before the position of the front blade spindle phase=60 (degrees), which is the position of the rear blade spindle phase=120 (degrees).

Therefore, as shown in FIG. 8, the tool locus of the front blade 141 and the tool locus of the rear blade 142 overlap. During the overlapping period of the tool loci in which the tool locus t3 of the rear blade 142 is included in the tool locus T3 of the front blade 141, there is the air-cut period in which the rear blade 142 (tool locus t3) substantially does not cut the workpiece W, and a chip generated on the workpiece W is divided into segmented chips. After that, in the second pass, when the front blade 141 reaches the cut portion in the first pass in the return movement thereof, or when the rear blade 142 reaches the tool locus of the front blade 141 in the return movement thereof, a chip is divided into segmented chips.

Further, although not shown, in this groove machining, in the third pass, for example, the machining time is set to 0 sec when the rear blade 142 is at the position of Z=0, and in the fourth pass, for example, the machining time is set to 0 sec when the front blade 141 is at the position of Z=0. Further, for example, the cutting amount in the third pass and the cutting amount in the fourth pass are set to different values. That is, the cutting amount in the third pass is set to a value smaller than the cutting amount in the second pass, and the cutting amount in the fourth pass is set to a value smaller than the cutting amount in the third pass.

As a result, in the third pass, when the rear blade 142 reaches the cut portion in the second pass, or when the rear blade 142 reaches the tool locus of the front blade 141, a chip is divided. Further, in the fourth pass, when the front blade 141 reaches the cut portion in the third pass, or when the rear blade 142 reaches the tool locus of the front blade 141, a chip is divided.

While the above-described groove machining is a step of forming a thread portion with vibration in the radial direction of the workpiece W, a finish machining is a step of forming a threaded portion without vibration in the radial direction of the workpiece W, and in the finish machining, only the front blade 141 is used and the rear blade 142 is not used. Therefore, the length of the rear blade 142 is set shorter than the length of the front blade 141, and as shown in FIG. 3, the cutting edge of the rear blade 142 is provided at a position lower than the cutting edge of the front blade 141 by h. That is, in the groove machining with vibration, the cutting amount and the amplitude are adjusted so that the front blade 141 and the rear blade 142 are used to machine the workpiece W, and in the finish machining without vibration, only the front blade 141 is used to machine the workpiece W. The control section 181 may set the amplitude of the vibration waveform to a value at which the cutting edge of the rear blade 142 does not come into contact with the screw bottom surface of the workpiece W in the finish machining. The amplitude can be set, for example, by the ratio (amplitude cut ratio) to the actual cutting amount of the cutting tool with respect to the workpiece W.

Figure 6:
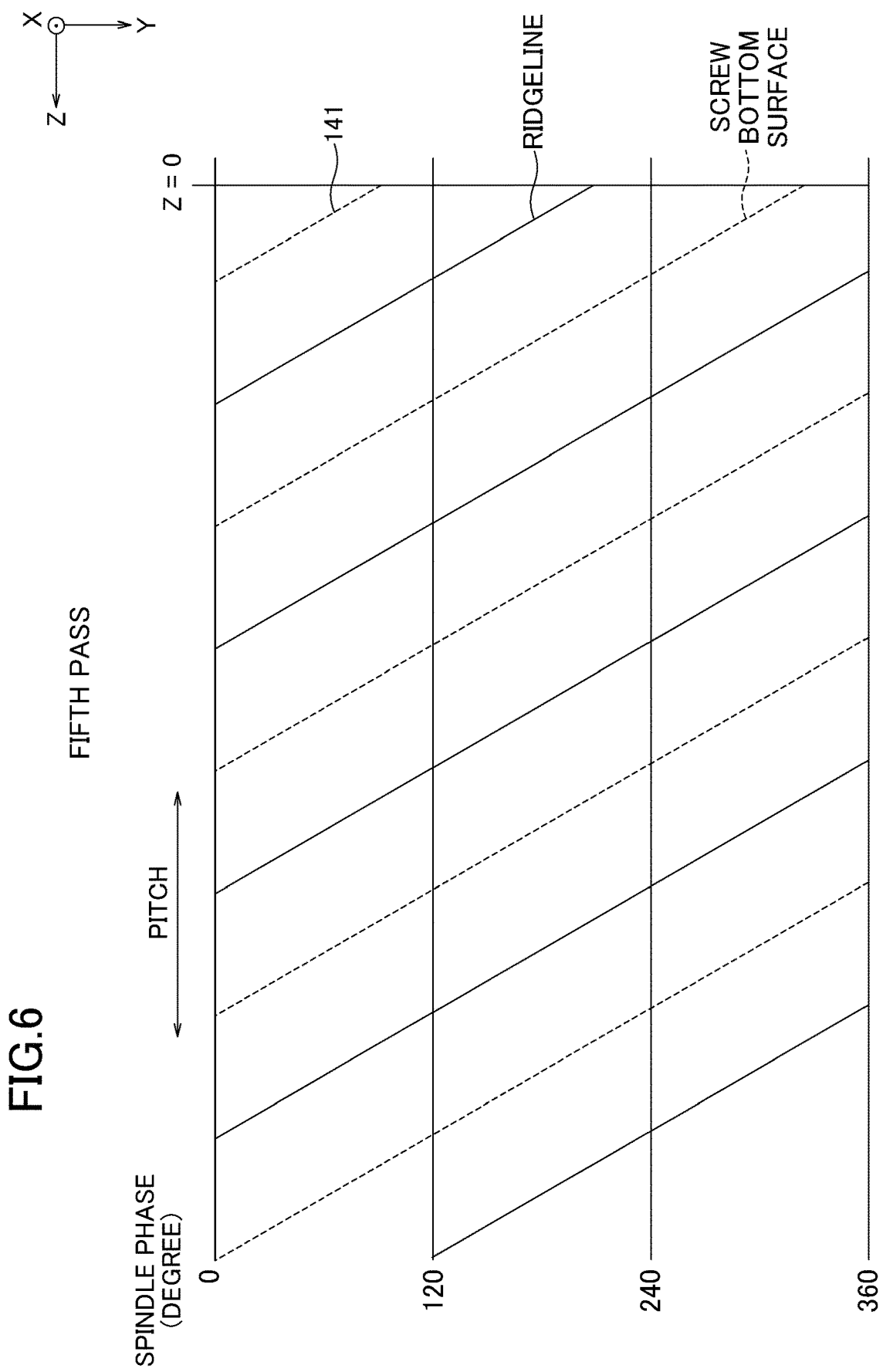
FIG. 6 is a diagram illustrating the time-series operation (in the final pass) of the threading.
Figure 9:
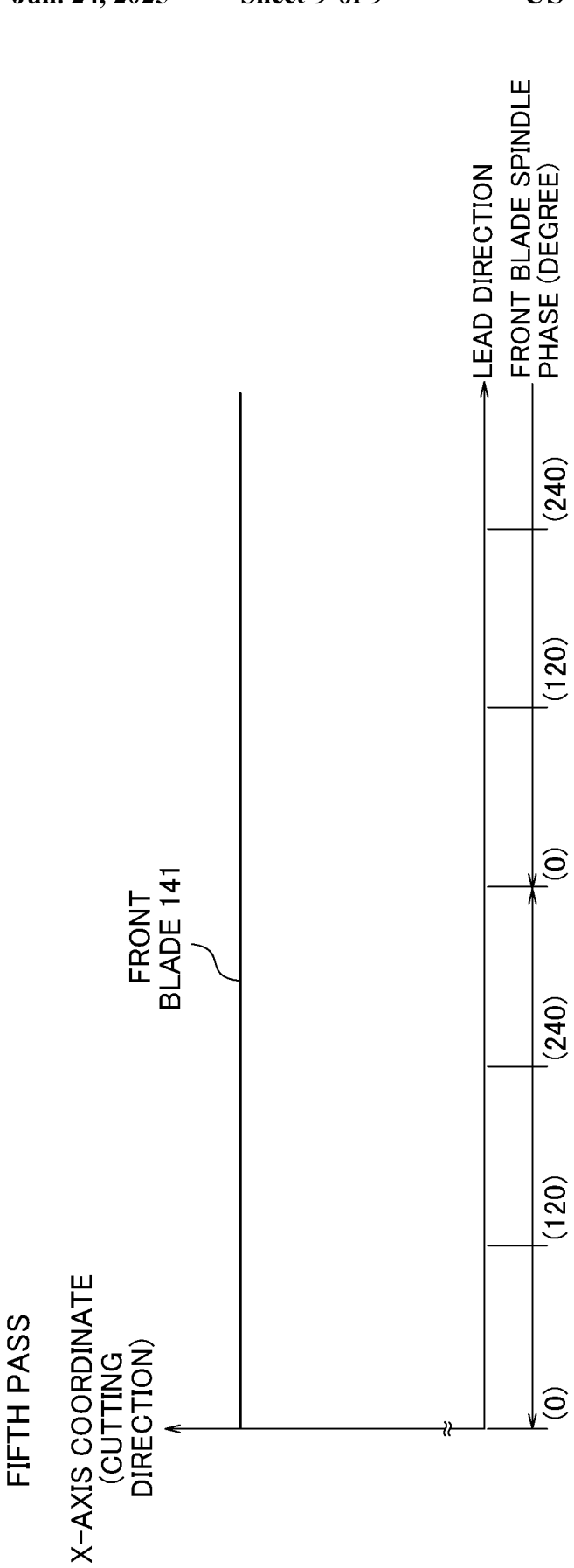
FIG. 9 is a diagram illustrating the tool locus (in the final path).

FIGS. 6 and 9 are diagrams illustrating the finish machining in the fifth pass.

The cutting amount in the last fifth pass is set to a value smaller than the cutting amount in the fourth pass. In the fifth pass, since the workpiece W does not reciprocally vibrate in the radial direction, the cutting amount is a constant value as shown in FIG. 9. If the machining time is set to 0 sec when the front blade 141 is at the position of Z=0, the cutting edge of the front blade 141 advances in contact with the screw bottom surface shown by the broken line in FIG. 6 and cuts the workpiece W to form the screw bottom surface of the workpiece W.

As described above, in the finish machining, the cutting edge of the rear blade 142 does not come into contact with the screw bottom surface of the workpiece W. Therefore, even if thread cutting is performed using the tip 131, a threaded portion with high machining accuracy can be formed.

Further, by adopting the multi-blade tip 131, the number of passes can be reduced and the machining time can be shortened as compared with the case where the single cutting blade is used. Further, since the rear blade 142 cuts the portion not cut by the front blade 141 and the front blade 141 cuts the portion not cut by the rear blade 142, the cutting resistance generated per blade is reduced and the lives of the blades are extended.

In FIG. 1, the example is described in which the spindle motor 115 corresponds to a rotating means (rotator), the Z-axis direction feeding mechanism 160 corresponds to a feeding means (feeder) for moving the spindle 110 in the Z-axis direction (predetermined feed direction), and the X-axis direction feeding mechanism 150 corresponds to a vibration means (vibrator) for reciprocally vibrating the cutting tool 130 in the X-axis direction on the basis of the set vibration waveform. However, the present invention is not limited to this example. For example, the vibration means may be installed separately from the X-axis direction feeding mechanism 150. Further, the cutting tool 130 may be fed in the Z-axis direction, or the cutting tool 130 may be rotated while the spindle 110 is stopped.

Further, although the example has been described in which the cutting blade is composed of two blades with reference to the drawings, the cutting blade may be composed of three or more blades.

REFERENCE SIGNS LIST 100 machine tool (machining device)
110 spindle (workpiece holding means, workpiece holder)
110A spindle headstock
115 spindle motor (rotating means, rotator)
120 chuck
130 cutting tool
130A tool post
130B holder
131 tip (multi-blade tool)
132 tool main body
133 through hole
141 front blade (first cutting blade)
142 rear blade (second cutting blade)
150 X-axis direction feeding mechanism (vibration means, vibrator)
151 base
152 X-axis direction guide rail
153 X-axis direction feeding table
154 X-axis direction guide
155 linear servomotor
155a mover
155b stator
160 Z-axis direction feeding mechanism (feeding means, feeder)
161 base
162 Z-axis direction guide rail
163 Z-axis direction feeding table
164 Z-axis direction guide
165 linear servomotor
165a mover
165b stator
180 control device
181 control section
h length from the cutting edge of the front blade to the cutting edge of the rear blade
T0 to T6 tool locus of the front blade
t0 to t8 tool locus of the rear blade
W workpiece

The invention claimed is:

1. A machining device comprising:
a workpiece holder holding a workpiece;
a tool post holding a multi-blade tool for cutting the workpiece;
a feeder feeding the multi-blade tool in a predetermined feed direction relative to the workpiece by relative movement of the workpiece holder and the tool post;
a vibrator relatively and reciprocally vibrating at least one of the workpiece holder and the tool post in a radial direction of the workpiece; and
a rotator relatively rotating at least one of the workpiece and the multi-blade tool,
the multi-blade tool having a first cutting blade and a second cutting blade that are arranged side by side along the feed direction, the second cutting blade being located behind the first cutting blade and having length shorter than length of the first cutting blade, and
the machining device threading the workpiece to form a threaded portion on the workpiece by relatively rotating at least one of the workpiece and the multi-blade tool and relatively moving at least one of the workpiece and the multi-blade tool along the feed direction and performing multiple times of cutting processes in the radial direction of the workpiece along the same cutting path in a predetermined spiral form, wherein
the machining device includes a controller controlling operations of the feeder, the vibrator and the rotator so that a groove machining to form the threaded portion by a first cutting blade and a second cutting blade of the multi-blade tool with the vibration in the radial direction of the workpiece and a finish machining to form the threaded portion by bringing only the first cutting blade of the multi-blade tool into contact with the grooved portion of the workpiece without the vibration in the radial direction of the workpiece are performed, and
the controller sets amplitude of a vibration waveform, which is set for the vibrator, to a value at which a cutting edge of the second cutting blade does not come into contact with a screw bottom surface of the workpiece in the finish machining.

2. The machining device according to claim 1, wherein the controller sets the amplitude of the vibration waveform, which is set for the vibrator, to zero in the finish machining.

* * * * *